United States Patent
Li et al.

(10) Patent No.: US 10,296,624 B2
(45) Date of Patent: *May 21, 2019

(54) DOCUMENT CURATION (71) Applicant: International Business Machines Corporation, Armonk, NY (US)

(72) Inventors: Shuo Li, Beijing (CN); Yue Li, Beijing (CN); Zhao Wei Li, Beijing (CN); Pei Pei Liang, Beijing (CN); Jun Liu, Beijing (CN); Yun Ting Wang, Beijing (CN); Xin Ying Yang, Beijing (CN); Guang Ming Zhang, Beijing (CN); Zhi Hui Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,586

(22) Filed: Jun. 12, 2017

(65) Prior Publication Data

US 2017/0277695 A1 Sep. 28, 2017

Related U.S. Application Data (63) Continuation of application No. 14/930,677, filed on Nov. 3, 2015.

(51) Int. Cl.
*G06F 17/20* (2006.01)
*G06F 17/30* (2006.01)
(Continued)

(52) U.S. Cl.
CPC ........ *G06F 17/3053* (2013.01); *G06F 3/0482* (2013.01); *G06F 3/0483* (2013.01);
(Continued)

(58) Field of Classification Search
CPC .......... G06F 17/3053; G06F 17/30699; G06F 3/0482
See application file for complete search history.

(56) References Cited

U.S. PATENT DOCUMENTS 6,266,060 B1 * 7/2001 Roth ..................... G06F 3/0482
715/206
7,716,225 B1  5/2010 Dean et al.
(Continued)

FOREIGN PATENT DOCUMENTS

WO  2010087882 A1  8/2010

OTHER PUBLICATIONS

Disclosed Anonymously et al., "Technique for dynamic tagging of content", An IP.com Prior Art Database Technical isclosure, IP.com No. 000234687, IP.com Electronic Publication: Jan. 28, 2014, 4 pages.

(Continued)

*Primary Examiner* — Mohammed H Zuberi
(74) *Attorney, Agent, or Firm* — Ulysses Williams, III (57) ABSTRACT

A method for curating documents, executed by a computer, includes detecting one or more themes in a document, identifying one or more user interests for a user, presenting a ranked list of the one or more themes to the user, and dynamically updating the ranked list based on user feedback. The ranked list may be ranked according to the one or more user interests. A computer program product and computer system corresponding to the above method are also disclosed herein.

6 Claims, 7 Drawing Sheets

(51) Int. Cl.
*G06F 3/0482* (2013.01)
*G06F 3/0483* (2013.01)
*G06F 3/0485* (2013.01)

(52) U.S. Cl.
CPC ........ *G06F 3/0485* (2013.01); *G06F 17/3043* (2013.01); *G06F 17/30699* (2013.01)

(56) References Cited

U.S. PATENT DOCUMENTS

| | | | |
|---|---|---|---|
| 7,885,986 B2 | 2/2011 | Anderson et al. | |
| 8,005,825 B1 | 8/2011 | Ghosh | |
| 8,095,582 B2 | 1/2012 | Cramer | |
| 8,380,710 B1* | 2/2013 | Finne | G06F 17/3053 707/723 |
| 9,047,283 B1* | 6/2015 | Zhang | G06F 17/30663 |
| 9,892,101 B1* | 2/2018 | Donnelley | G06F 17/24 |
| 2009/0216696 A1* | 8/2009 | Downs | G06F 17/30675 706/20 |
| 2012/0206472 A1* | 8/2012 | Kandekar | G06Q 30/0214 345/581 |
| 2013/0158984 A1* | 6/2013 | Myslinski | G06F 17/28 704/9 |
| 2013/0254217 A1 | 9/2013 | Xu | |
| 2015/0281784 A1* | 10/2015 | Laksono | H04N 21/44008 725/10 |
| 2016/0357366 A1* | 12/2016 | Migos | G06F 3/0482 |
| 2017/0286546 A1* | 10/2017 | Cardonha | G06F 17/3053 |

OTHER PUBLICATIONS

Vallet et al., "Personalizing Web Search with Folksonomy-based User and Document Profiles", C. Guinn et al. (Eds.): ECIR 2010, LNCS 5993, pp. 420-431, 2010, © Springer-Verlag Berlin Heidelberg 2010.

Vyasarayamut et al., "Content Bookmarking and Recommendation", Proceedings of the Workshop on Speech and Language Processing Tools in Education, pp. 69-78, COLING 2012, Mumbai, Dec. 2012.

Li et al., "Document Curation", U.S. Appl. No. 14/930,677, filed Nov. 13, 2016, 33 pages.

IBM Appendix P, list of patents and patent applications treated as related, filed herewith, 2 pages.

* cited by examiner

DOCUMENT CURATION

BACKGROUND OF THE INVENTION

The present invention relates generally to searching for information, and more specifically, to recommending relevant sections of a document based on a user's search query.

In the field of searching, a query is one or more search terms that a user enters into a search engine to satisfy his or her information needs. Search queries may be plain text or adhere to a specific syntax, and may contain special operators that include or exclude certain results. One manner of searching through a document is text searching, which shows a user all of the locations in a document in which the user's search phrase appears. Often, a user must spend a good deal of time searching through documents to find passages that are relevant to the user's search.

SUMMARY

As disclosed herein, a method for curating documents, executed by a computer, includes detecting one or more themes in a document, identifying one or more user interests for a user, presenting a ranked list of the one or more themes to the user, and dynamically updating the ranked list based on user feedback. The ranked list may be ranked according to the one or more user interests. A computer program product and computer system corresponding to the above method are also disclosed herein.

DETAILED DESCRIPTION

Embodiments of the present invention relate generally to searching for information, and more specifically, to recommending relevant sections of a document based on a user's search query. One way that a user may search for information within documents is a text search, which returns locations within a document that contain the search word or phrase. A problem with this is that the user may still need to read many documents before the user finds information that is useful. Furthermore, the search may only work in the current page, and may fail if the search phrase is positioned such that it spans across pages of a document or over multiple documents. Another way that a user may search for information within documents is if the document has been provided with bookmarks that point to specific topics within the document. However, this requires that the document be curated beforehand and may be tedious. Embodiments of the present invention addresses these issues by automatically generating dynamic hotspots on a document based on certain criteria, such as the document-browsing history of past readers. These dynamic hotspots may thus represent where previous readers most frequently found the information most relevant to the same or similar queries.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
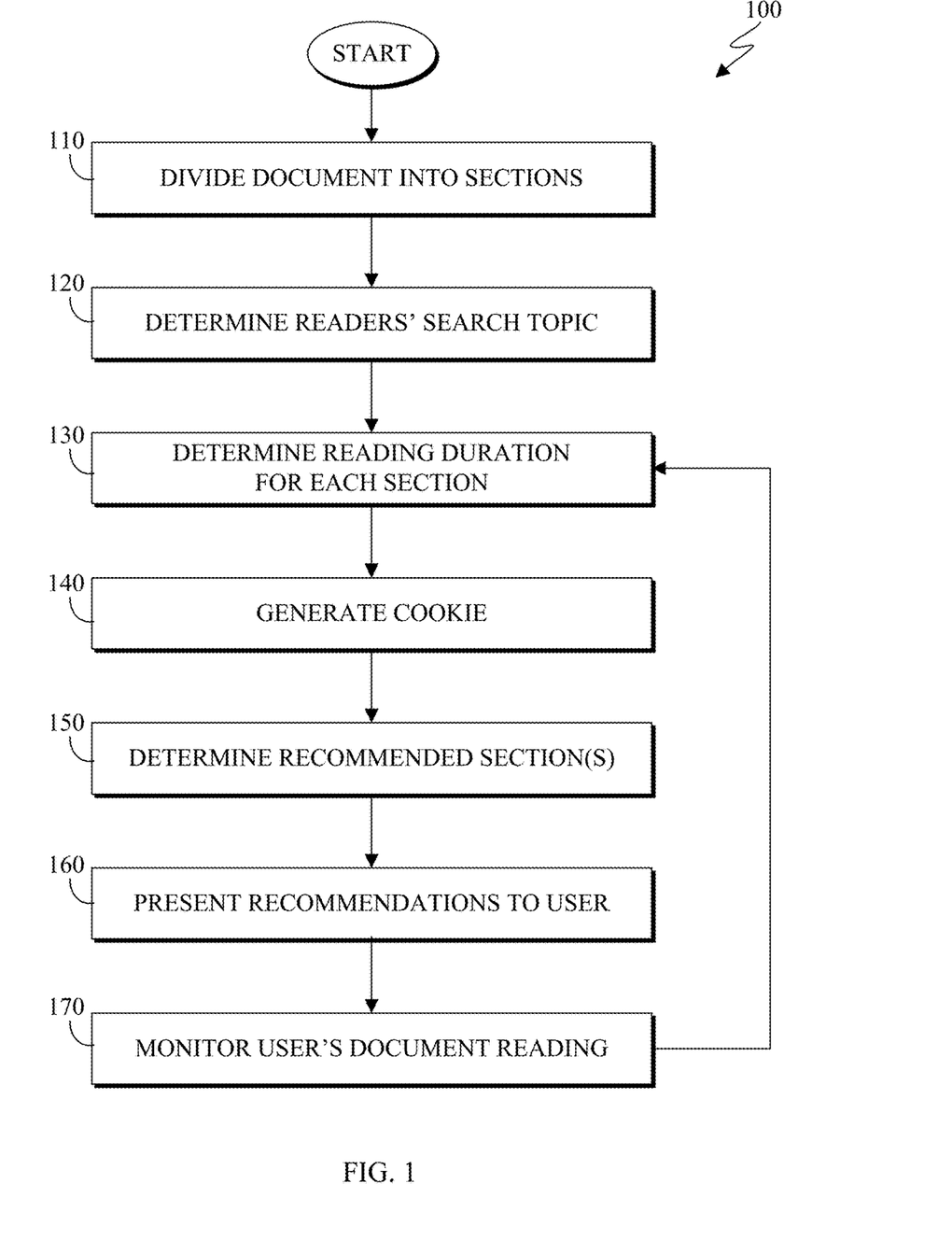
FIG. 1 is a flowchart depicting one embodiment of a recommendation method in accordance with the present invention.

FIG. 1 is a flowchart depicting one embodiment of a recommendation method 100 in accordance with the present invention. As depicted, the recommendation method 100 includes dividing (110) a document into sections, determining (120) readers'search topics, determining (130) reading duration, generating (140) a cookie, determining (150) recommended sections, presenting (160) recommendations, and monitoring (170) a user's reading. The recommendation method 100 may thus provide users with sections of a document relevant to the user's inquiry while iteratively improving the recommendations based on the user's behavior.

Dividing (110) a document into sections may include splitting a document (or group of documents) into sections or blocks. The sections may share a uniform length or differ in their sizes. In some embodiments, each paragraph constitutes a section; in other embodiments, each viewable page constitutes a section. Each section may continue for as long as a particular topic or common theme is discussed; this may be determined by analyzing the text to determine a topic or theme.

Determining (120) readers'search topics may include determining the topic or topics of the query in which each reader is interested. In some embodiments, each search query may be stored as its own unique search; for example, "apples" will be stored as "apples," and "pears" will be stored as "pears." In other embodiments, algorithms suitable for classifying searches may be employed to store searches as categories of topics; for example, "apples" and "pears"

may be stored as "fruits." In some embodiments, a combination of both approaches to determining (120) readers' search topics is used.

Determining (130) a reading duration may include monitoring each reader to determine how long they spend reading each section of the document. In some embodiments, the reading duration is determined by how long a reader's device displays each section. For example, if each section is a page, and the document is read on an e-book, then the reading duration may be determined by how long the reader remains on that page. Particular sections may also be marked as relevant if the reader selects text, copies the information, saves a portion of the section, and/or shares information from a section.

Generating (140) a cookie may include creating a cookie for each reader of the document(s). The cookie may include information that records how much time the reader spent on each section. In one embodiment, the cookie contains a list of each section and the number of seconds or minutes that the reader spent on that section. The cookie's list of section may skip over sections that the reader skipped over entirely.

Determining (150) recommended sections may include determining which section or sections in particular are relevant to the user's search topic. Sections may be recommended based on a combination of previous readers' search topics and previous readers' reading durations for each section. For example, if a large number of readers who all share the same (or similar) search topic spent a good deal of time reading sections 5 and 7 of a document, then sections 5 and 7 may be recommended to any user having a similar search topic. Any statistical methods (such as omitting outliers) or data mining technologies that would be known to a person having ordinary skill in the art may be employed to arrive at recommendations for this recommended section determining operation 150. In some embodiments, the cookies generated by previous readers are sent to a server which then determines recommended sections based on an analysis of information contained in the cookies.

Presenting (160) recommendations to a user may include indicating which sections of a document or documents are relevant to a user's search topic. In some embodiments, the recommended sections are indicated by overlaying a heatmap over the text corresponding to where previous readers had the longest reading durations. A heat map is a graphical representation of data where the individual values contained in a matrix are represented as colors. The heatmap may appear as a highlighting effect overlaying the text; the more highly recommended a section is, the greater the degree, heaviness, or intensity of highlighting. In some embodiments, the recommendations are presented to a user as a list of sections. The list of sections may contain hyperlinks or bookmarks that enable a user to skip directly to the corresponding section in a document. Recommendations may be presented to a user by omitting all unrecommended sections of a document, so that the user is presented with an edited text consisting of only the recommended sections.

Monitoring (170) the user's reading may include determining the user's reading duration spent on each recommended section, as well as reading durations for any sections that where not recommended to a user (which may indicate relevance). The user monitoring operation 170 may function similarly to the reading duration determination operation 130. Thus, the recommendation method 100 may iteratively improve the accuracy of recommendations, as each user ultimately becomes a previous reader from the perspective of the next user.

Figure 2:
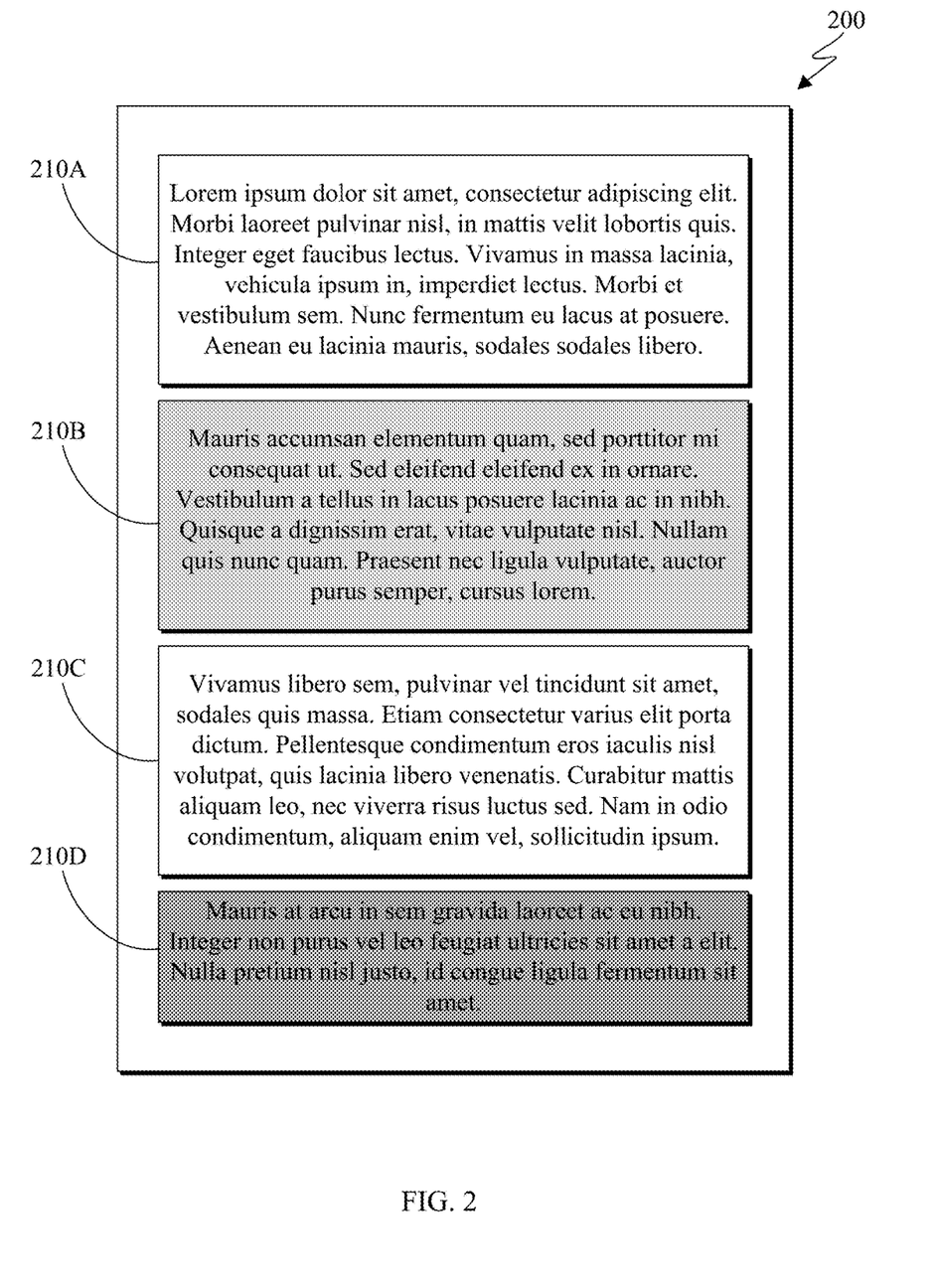
FIG. 2 depicts an example of one embodiment of a document in accordance with the present invention.

FIG. 2 depicts an example of one embodiment of a document 200 in accordance with the present invention. As depicted, the document 200 includes four sections 210A-210D. The recommendation method 100 has been performed on the document 200, and the document is presented to a user as such. The sections 210A-210D may be the same length or different lengths (as depicted). Sections 210B and 210D are both marked as recommended sections for a user. As depicted, section 210D is more relevant than section 210B, as indicated by the intensity of the highlighting. Sections 210A and 210C may either be not recommended, or recommended much less as compared to sections 210B and 210D. In some embodiments, instead of highlighting, annotations around or to the side of each section, or special symbols indicate that the section is recommended and to which degree the section is recommended.

Figure 3:
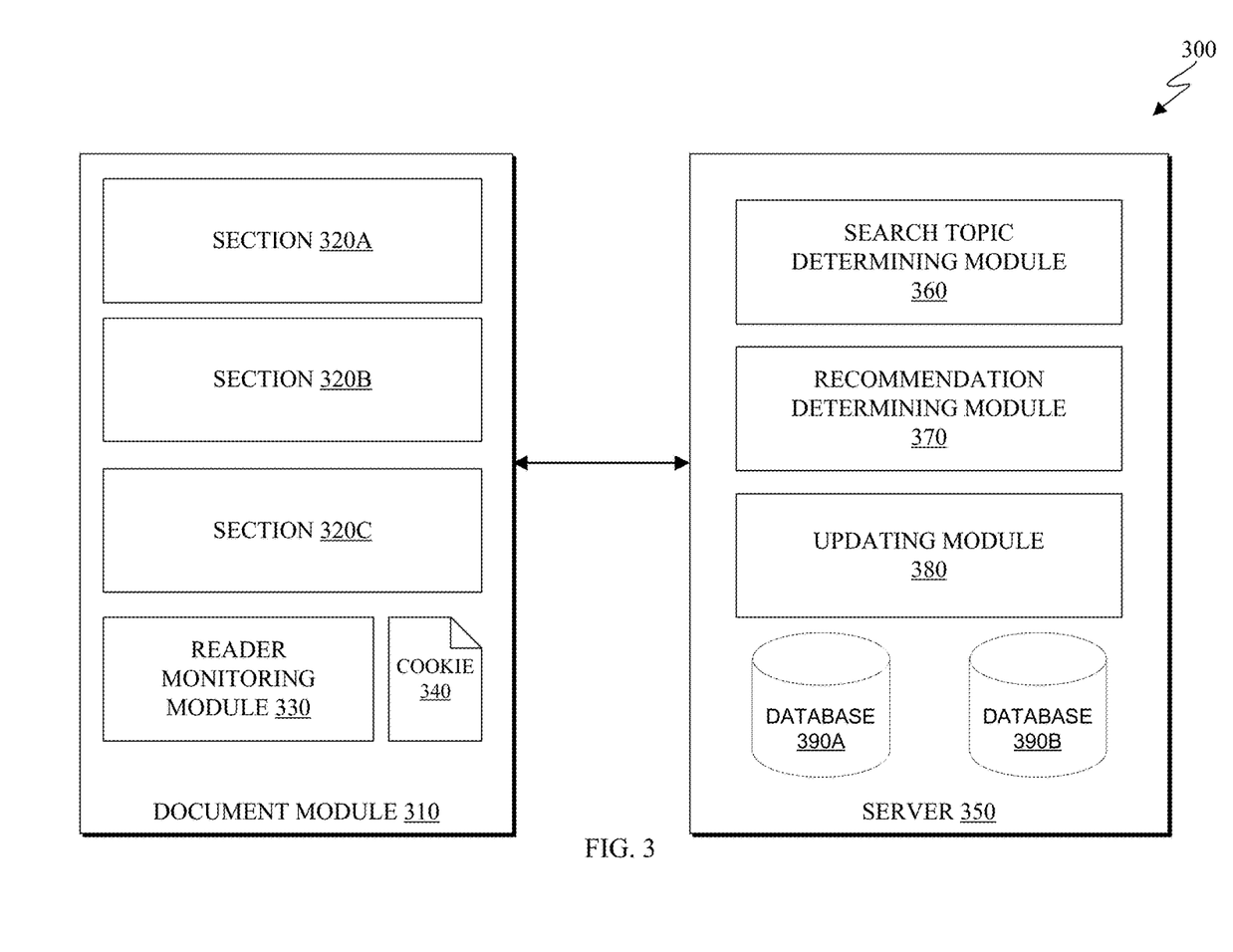
FIG. 3 depicts an example of one embodiment of a recommendation system in accordance with the present invention.

FIG. 3 depicts an example of one embodiment of a recommendation system 300 in accordance with the present invention. As depicted, the recommendation system 300 includes a document module 310, sections 320A-320C, a reader monitoring module 300, cookie 340, server 350, search topic determining module 360, recommendation determining module 370, updating module 380, and databases 390A and 390B. In some embodiments, the document module 310 is on the user's end, and the server 350 is remote and accessible via a network, such as the Internet.

The document module 310 may include one or more documents split into multiple sections 320A-320C, a reader monitoring module 330, and a cookie 340. The document module 310 may be operated on a user's device, such as a smartphone, laptop, e-reader, tablet, or the like. The document module 310 may include one or more documents or may access documents remotely via a network. As the sections 320A-320C are presented to a user, they may be indicated as recommended or not.

While the user reads the sections of a document, the reader monitoring module 330 may monitor the user's reading habits. For example, if a user spends more time reading a certain section, or returns to that section multiple times, the reader monitoring module 330 may take note such that it may be later determined whether a particular section is to be recommended to future readers. The reader monitoring module 330 may perform the reading duration determination operation 130 and the cookie generation operation 140. The cookie 340 may include information that records how much time the reader spent on each section. In one embodiment, the cookie contains a list of each section and the number of seconds or minutes that the reader spent on that section. The cookie's list of section may skip over sections that the reader skipped over entirely.

The information in the cookie 340 may be sent to the server 350 for analysis. In some embodiments, the information in the cookie 340 is sent whenever the cookie 340 is changed or updated, while in other embodiments, the information in the cookie 340 is sent according to a prearranged schedule. The server 350 may also receive information relating to the search topics of readers, which is analyzed by the search topic determining module 360 to determine the topic or topics for which a reader is searching. The server 350 may then correlate the search topic(s) as determined by the search topic determining module 360 with a list of sections 320 that are recommended for the search topic.

The information in each cookie 340 may be analyzed by the recommendation determining module 370 in order to determine which sections 340 to recommend based on the search topic(s) determined for the reader from which the cookie 340 was received. The updating module 380 may use the habits of readers, as calculated using information from past readers' cookies 340, as well as a current user's reading habits, to update the databases 390A and 390B. Thus, the updating module 380 ensures that recommendations remain accurate even if reader's habits cause the relevance of sections to change over time.

The updating module 380 may update the databases 390. The databases 390A and 390B may store such information as the correlation between recommended sections and search topics, the degree to which each recommended section is recommended, and information from each cookie 340. In the depicted example, there are two databases, 390A and 390B; however, there may be any number of databases. In some embodiments, the databases 390 serve as memory storage for one or more of the depicted modules.

Figure 4:
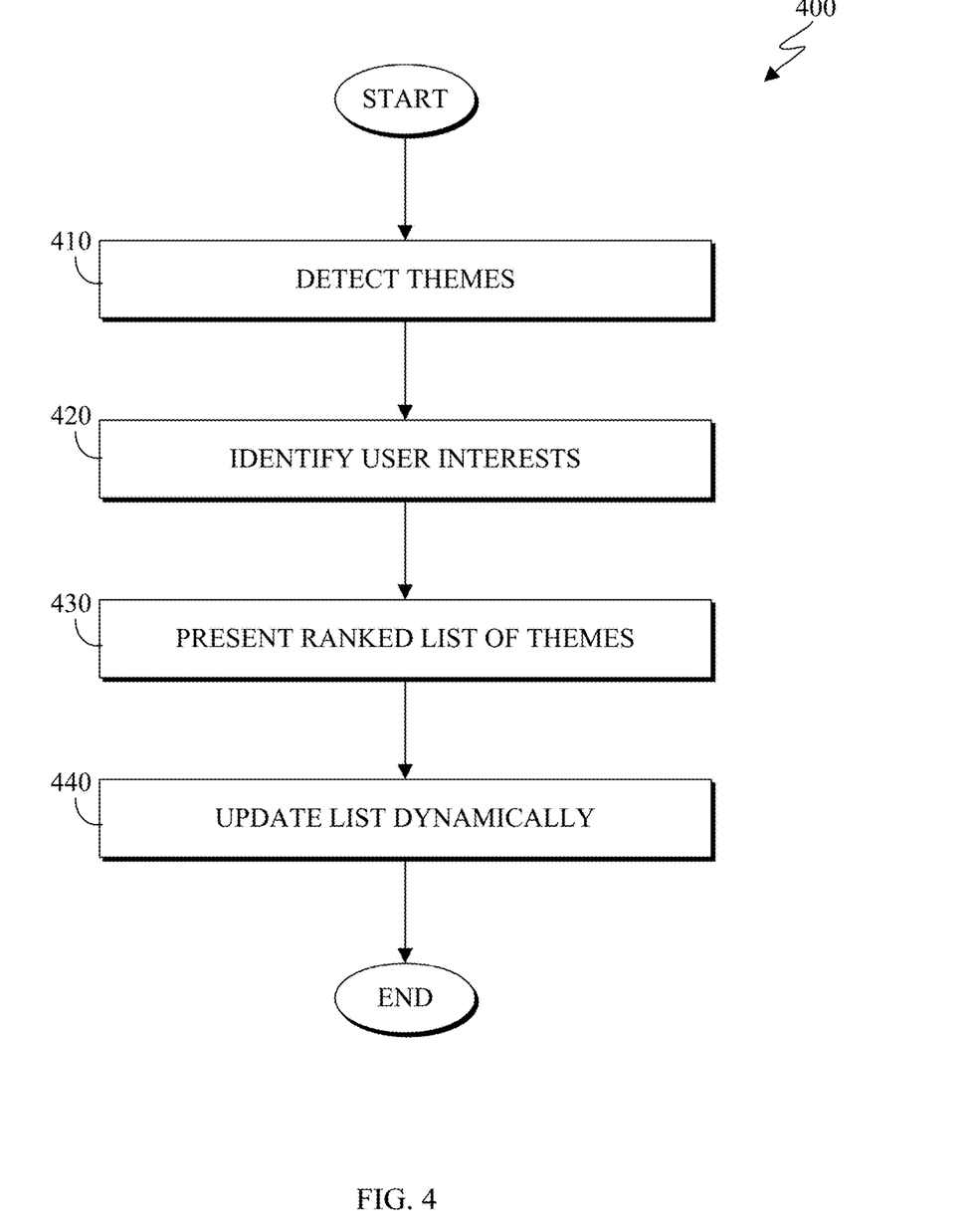
FIG. 4 is a flowchart depicting one embodiment of a document curation method in accordance with the present invention.

FIG. 4 is a flowchart depicting one embodiment of a document curation method 400 in accordance with the present invention. As depicted, the document curation method 400 includes detecting (410) themes, identifying (420) user interests, presenting (430) a ranked list, and updating (440) the list. The document curation method 400 may thus curate a document by selectively presenting portions of the document that are relevant to the user, thereby enabling a user to skip over parts of a document that may be less relevant to the user.

Detecting themes (410) may include determining one or more themes that are present in a document. For example, an article relating to tourism may contain several themes or topics, such as information about local cuisine, entertainment, museums, public transportation, and the like. In one embodiment, the theme(s) are determined according to natural language processing techniques. The themes may also be pre-defined by the author or authors of the document. For example, an author may indicate which paragraphs relate to entertainment and which paragraphs relate to local cuisine. The themes may also be abstracted by readers. For example, the recommendation method 100 may be used to determine which sections of a document correspond to which themes based on previous readers' reading habits.

In some embodiments, the themes are derived according to a combination of sources: natural language processing, author-defined themes, and themes that are abstracted by readers. An algorithm may combine the themes as follows:

$$S_1 = \{T_1(f_{1,1}), T_2(f_{1,2}), \ldots, T_n(f_{1,n})\} \quad (1)$$

$$S_2 = \{T_1(f_{2,1}), T_3(f_{2,3}), \ldots, T_m(f_{2,m})\} \quad (2)$$

$$S_3 = \{T_3(f_{3,3}), T_5(f_{3,5}), \ldots, T_k(f_{3,k})\} \quad (3)$$

$$\text{Themes: } \{(S_1, w_1), (S_2, w_2), (S_3, w_3)\} = \{T_1(w_1 * f_{1,1} + w_2 * f_{2,1}), T_2(w_1 * f_{1,2}), T_3(w_2 * f_{2,3} + w_3 * f_{3,3}), \ldots, T_n(w_1 * f_{1,n}), T_m(w_2 * f_{2,m}), T_k(w_3 * f_{3,k})\} \quad (4)$$

where $S_i$ represents the different sources (natural-language processing, author-defined themes, and reader-abstracted themes), $T_i$ represents the different themes, $F_{i,j}$ represents the frequency of which the themes are mentioned in the document, and $W_i$ represents the weight of different resources. The final list of themes may be defined as:

$$\text{Themes: } \{(T_1, P_1), (T_2, P_2), (T_3, P_3), (T_5, P_5), \ldots, (T_n, P_n),\} \quad (5)$$

where $P_i$ represents the priority of each theme.

Identifying (420) user interests may include determining the topics or themes that are of personal interest to a user. In some embodiments, the user interests may be defined by the user. User interests may also be determined by a user's reading history. Information obtained from a user's social network may also be used to define user interests. For example, If a user A is a fan of person B, then B's interests may be considered to be A's interests as well. In some embodiments, this may function negatively such that if B is disinterested in a topic, that topic will not appear as a user interest to A. In some embodiments, the user interests are derived according to a combination of sources: user-defined interests, interests determined from a user's history, and interests determined from a user's social media habits.

Presenting (430) a ranked list of themes may include determining a ranked list for the themes for the user, and displaying the ranked list to the user. A ranked or weighted list of themes may be extracted by weighing the themes that were detected in the theme detection operation 410. The themes may be weighed according to the levels of user interest for each theme as determined in the user interest identification operation 420. The ranked list of themes may be represented by a relation such as $$\text{Ranked Themes} = \{T_2, T_4, T_5, T_1, T_3, T_6, \ldots, T_n\} \quad (6)$$

where the themes appear in ascending/descending order of relevance to a user. In the example of equation 6, the user's most favorite theme may be $T_2$, followed by $T_4$, then $T_5$, etc. The list of ranked themes may then be presented to a user. In some embodiments, the themes are included in a menu, and when the user activates a theme, the document auto-scrolls to the section of the document containing that theme.

Updating (440) the ranked list dynamically may include adding or removing themes to the list as the user reads the various themes or otherwise traverses the documents. In one embodiment, only a few themes at a time are shown to a user, and when the user finishes reading one theme, that theme then disappears from the ranked list of themes, the rest of the themes move up one, and a new theme appears at the end that was not being displayed to the user before. Using equation 5 as an example, if the user can only see the top three themes $T_2$, $T_4$, and $T_5$, and the user reads theme four, then $T_4$ is removed from the list, and the next theme in queue, $T_1$, is appended to the end such the list now reads $T_2$, $T_5$, and $T_1$.

Figure 5A:
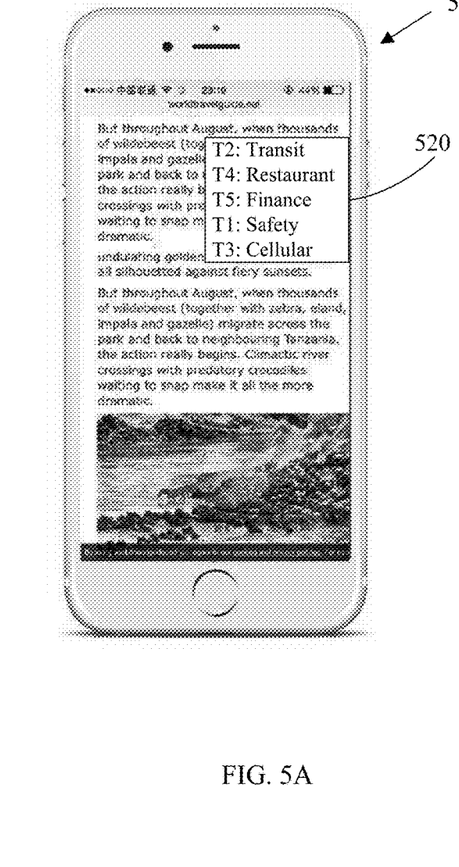
FIGS. 5A and 5B depict an example of one embodiment of an apparatus suitable for executing the methods disclosed herein.
Figure 5B:
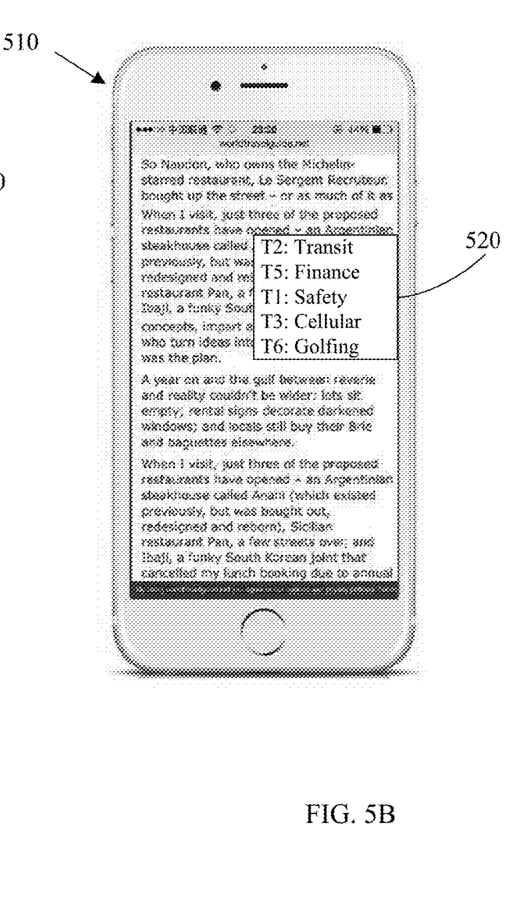

FIGS. 5A and 5B depict an example of one embodiment of an apparatus suitable for executing the methods disclosed herein. The depicted example includes device 510 and floating menu 520. FIGS. 5A and 5B may represent a before-and-after depiction demonstrating the changes that occur when a user finishes reading a theme. The device 510 may include any computing device such as a cell phone, PDA, tablet, laptop, or the like. As depicted, the floating menu 520 hovers over an area of the document that the user is not reading. The floating menu 520 may contain the ranked list of themes from document curation method 400. As depicted, the floating menu 520 in FIG. 5A displays that the user's interests include topics $T_2$ (transit), $T_4$ (restaurants) $T_5$ (finance), $T_1$ (safety), and $T_3$ (cellular). After the user reads about the restaurants (i.e. topic $T_4$), that topic may disappear from the list, and topics $T_5$, $T_1$, and $T_3$ may rise up the list, allowing room for a new topic, $T_6$ (golfing) to be appended at the bottom. The golfing topic may have been in the queue as the next topic, but the due to display dimensions or user settings, the floating menu 520 was set to show only five themes at a time.

Figure 6:
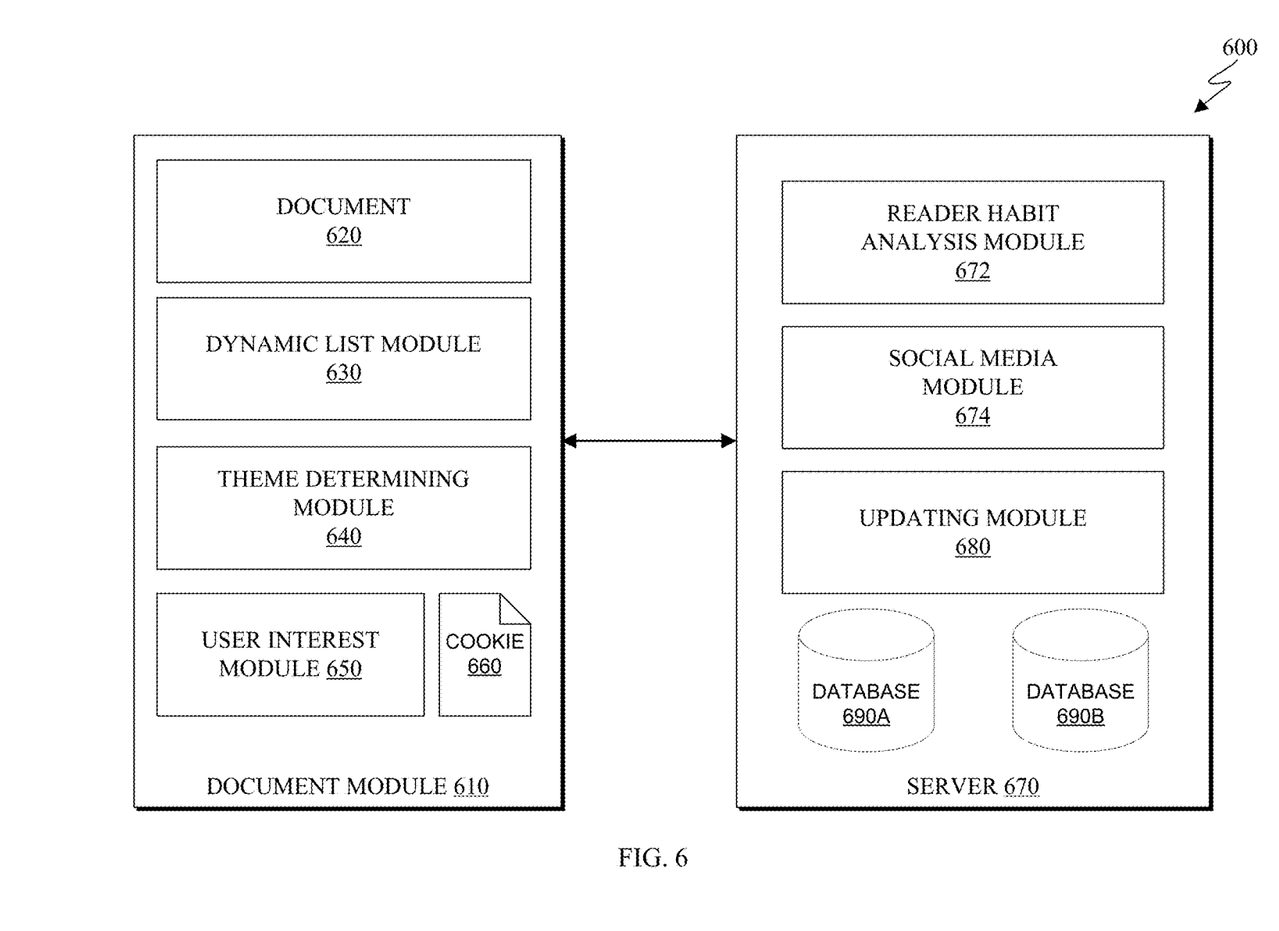
FIG. 6 is a block diagram depicting one embodiment of a document curation system in accordance with the present invention.

FIG. 6 is a block diagram depicting one embodiment of a document curation system 600 in accordance with the present invention. As depicted, the document curation system 600 includes a document module 610 with one or more documents 620, dynamic list module 630, theme determining module 640, user interest module 650, and cookie 660;

and server 670, which includes reader habit analysis module 672, social media module 674, updating module 680, and one or more databases 690A and 690B. The document module 610 and server 670 are connected via a network, such as the Internet, and server 670 may access other document modules 610, as well as other servers, such as social media servers.

The document module 610 may be operated on a user's device, such as a smartphone, laptop, e-reader, tablet, or the like. The document module 610 may include one or more documents 620 or may access documents 620 remotely via a network. The dynamic list module 630 may present the ranked list to the user, such as by overlaying the ranked list over the document 620 as a floating menu. The dynamic list module 630 may generate the ranked lists for the user and update the ranked list accordingly as the user reads the document.

The theme determining module 640 may analyze the document 620 for one or more themes, thereby performing the theme detection operation 410. In the depicted embodiment, the theme determining module 640 is associated with the document module 610; however, in other embodiments, the theme determining module 640 is associated with the server 670. The user interest module 650 may receive input to determine user interests. In some embodiments, the user interest module 650 executes the user interest identification operation 420. The user interest module 650 may receive input from a user via the document module 610 or input relating to other readers via server 670. The user interest module 650 may also create the cookie 660, which may be used to store information relating to the habits of the user to be sent to the server 670. Thus, one user may become a reader from the perspective of another user, and the user's statistics, reading habits, and interests may be used accordingly.

The server 670 may receive information regarding readers' reading habits, user interests, etc., and store and analyze the data such that statistics gathered about each user may be shared with all of the other users, thus enabling for large-scale data processing that enables, e.g., enhanced accuracy in determining a user's interests. The reader habit analysis module 672 may receive information regarding readers' habits and analyze the information. In one embodiment, the reader habit analysis module 672 receives this information via cookies 660 generated for each user. The social media module 674 may access social media databases to perform operations of the document curation method 400, such as the user interest identification operation 420. As depicted, the social media module 674 is associated with the server 670; however, in other embodiments, the social media module 674 may be associated with the document module 610.

The updating module 680 may update any analyzed data that has been stored with newly-analyzed data as the document module 610 and server 670 continually receive new information via their modules. The updating module 680 may access databases 690A and/or 690B for storage purposes, and to share the stored data with the other modules. For example, the updating module 680 may update user interests whenever the social media module 674 receives new information about people whom the user follows/favorites on social media. The updating module 680 may also update the various themes of a document 620 as other readers' reading of the document 620 changes the reader-abstracted themes. Databases 690A and 690B may be accessible to any or all modules and may serve as storage through which information may be shared among modules. In the depicted example, there are two databases, 690A and 690B; however, there may be any number of databases. In some embodiments, the databases 690 serve as memory storage for one or more of the depicted modules.

Figure 7:
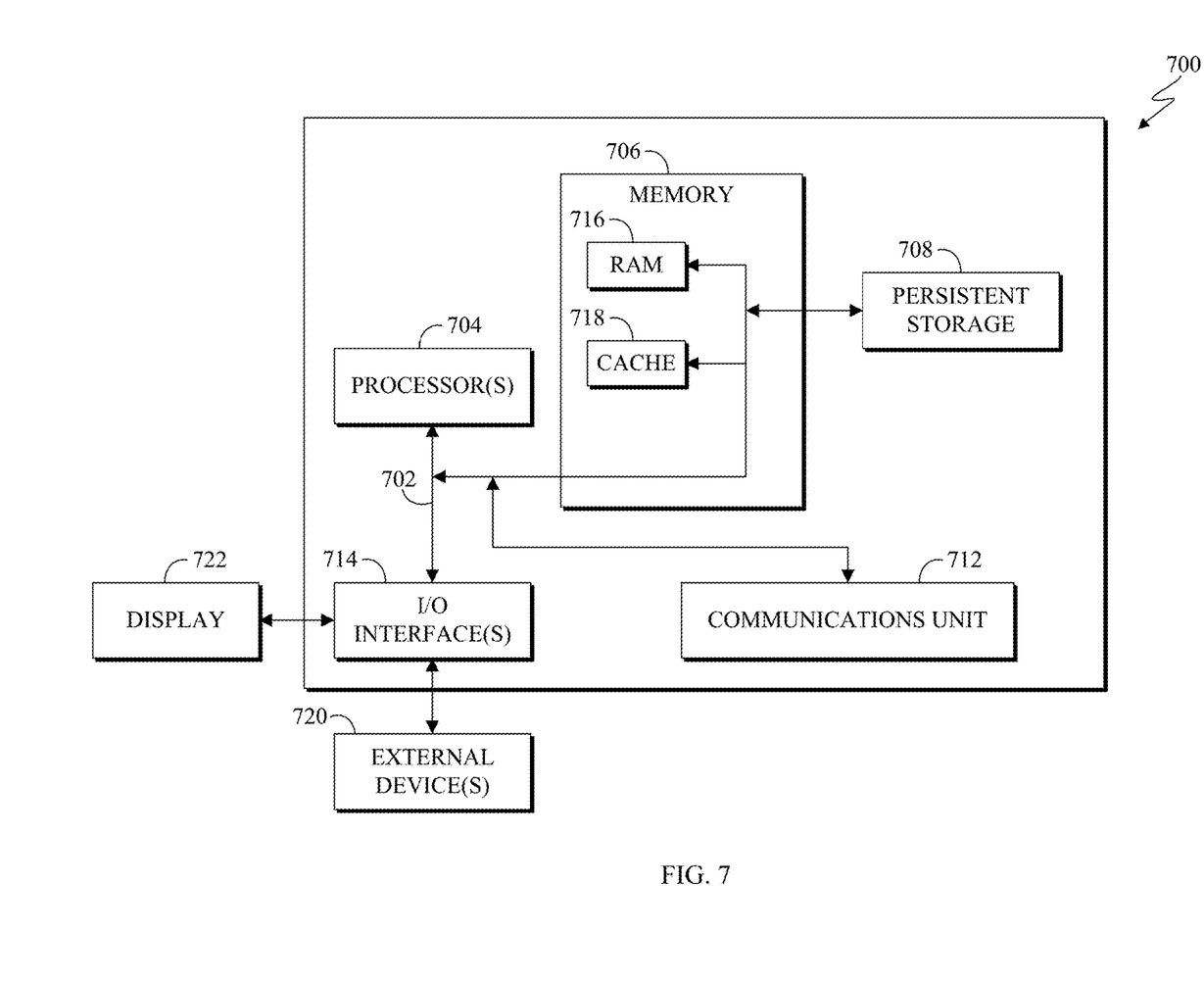
FIG. 7 is a block diagram depicting one example of a computing apparatus (i.e., computer) suitable for executing the methods disclosed herein.

FIG. 7 is a block diagram depicting components of a computer 700 suitable for executing the methods disclosed herein. It should be appreciated that FIG. 7 provides only an illustration of one embodiment and does not imply any limitations with regard to the systems in which different embodiments may be implemented. Many modifications to the depicted system may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In the depicted embodiment, memory 706 includes random access memory (RAM) 716 and cache memory 718. In general, memory 706 can include any suitable volatile or non-volatile computer readable storage media.

One or more programs may be stored in persistent storage 708 for execution by one or more of the respective computer processors 704 via one or more memories of memory 706. The persistent storage 708 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 708 via I/O interface(s) 714. I/O interface(s) 714 may also connect to a display 722. Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for curating documents, the method comprising:
   detecting one or more themes in a document based upon duration of time a plurality of previous readers spent reading a section of the document;
   identifying one or more user interests for a user;
   presenting a ranked list of the one or more themes to the user, wherein the ranked list is determined based upon the duration of time that one or more readers spent on the section of the document; and
   dynamically updating the ranked list based on user feedback, wherein:
   the user feedback is based on the previous readers' habits; and
   as the user traverses the document, at least one theme of the one or more themes are removed from the ranked list in real time.

2. The method of claim 1, wherein a theme of the one or more themes is further determined by a number of times that a reader returns to the section of the document.

3. The method of claim 1, wherein a theme of the one or more themes is pre-defined by an author of the document.

4. The method of claim 1, wherein a theme of the one or more themes is determined by analyzing reading habits of a plurality of readers of the document.

5. The method of claim 1, wherein presenting a ranked list of the one or more themes to the user comprises overlaying a hover menu over the document, wherein the hover menu presents colored areas of the document and an intensity of the color in the areas represents the duration of time that one or more readers has viewed the area; and further comprising scrolling the document to a theme in response to the user activating the theme on the hover menu.

6. The method of claim 1, wherein identifying the one or more user interests comprises analyzing user social network information.

* * * * *